US012323031B2

(12) United States Patent
Li et al.

(10) Patent No.: US 12,323,031 B2
(45) Date of Patent: Jun. 3, 2025

(54) NOISE-REDUCED POWER DEVICE, NOISE REDUCTION MECHANISM, AND NOISE REDUCTION METHOD

(71) Applicant: DEWERTOKIN TECHNOLOGY GROUP CO., LTD., Jiaxing (CN)

(72) Inventors: Long Li, Jiaxing (CN); Cheng Chen, Jiaxing (CN)

(73) Assignee: DEWERTOKIN TECHNOLOGY GROUP CO., LTD., Jiaxing (CN)

( * ) Notice: Subject to any disclaimer, the term of this patent is extended or adjusted under 35 U.S.C. 154(b) by 90 days.

(21) Appl. No.: 18/218,190

(22) Filed: Jul. 5, 2023

(65) Prior Publication Data

US 2025/0015666 A1    Jan. 9, 2025

Related U.S. Application Data

(63) Continuation of application No. PCT/CN2021/070245, filed on Jan. 5, 2021.

(51) Int. Cl.
*H02K 5/24* (2006.01)
*F16H 25/24* (2006.01)
*H02K 7/06* (2006.01)
*H02K 7/116* (2006.01)
*F16H 25/20* (2006.01)

(52) U.S. Cl.
CPC .............. *H02K 5/24* (2013.01); *F16H 25/24* (2013.01); *H02K 7/06* (2013.01); *H02K 7/1166* (2013.01); *F16H 2025/2031* (2013.01); *F16H 2025/2084* (2013.01); *F16H 2025/209* (2013.01)

(58) Field of Classification Search
CPC .............................. H02K 5/24; H02K 7/1166
See application file for complete search history.

(56) References Cited

U.S. PATENT DOCUMENTS 10,094,456 B2    10/2018  Hu et al.

FOREIGN PATENT DOCUMENTS

| CN | 201360692 Y | * | 12/2009 | |
|----|-------------|---|---------|----------|
| CN | 101710752 A | * | 5/2010  | ............... H02K 5/24 |
| CN | 204243993 U |   | 4/2015  | |
| CN | 207559760 U |   | 6/2018  | |
| CN | 207875329 U |   | 9/2018  | |
| CN | 209562306 U |   | 10/2019 | |
| CN | 209562307 U |   | 10/2019 | |

(Continued)

OTHER PUBLICATIONS

International Search Report of Corresponding Application No. PCT/CN2021/070245; Oct. 11, 2021; 6 Pgs.

(Continued)

*Primary Examiner* — Randell J Krug
(74) *Attorney, Agent, or Firm* — Cooper Legal Group, LLC (57) ABSTRACT

The present application relates to a noise-reduced power device, a noise reduction mechanism and a noise reduction method, and particularly to the technical field of a power device. The noise-reduced power device includes a housing, a transmission assembly is provided in the housing, a power input end of the transmission assembly is connected to a motor, a power output end thereof is connected to a screw rod extending out of the housing, a gap is formed between the motor and an inner wall of the housing, and a noise reduction mechanism is provided around the motor.

14 Claims, 5 Drawing Sheets

(56) References Cited

FOREIGN PATENT DOCUMENTS

| | | |
|---|---|---|
| CN | 211280545 U | 8/2020 |
| DE | 19752672 C1 | 3/1999 |
| EP | 2375548 A1 | 10/2011 |

OTHER PUBLICATIONS

Supplementary European Search Report cited in corresponding European patent Application No. 21916698.0, dated Jan. 4, 2024, 3 pages.

* cited by examiner

NOISE-REDUCED POWER DEVICE, NOISE REDUCTION MECHANISM, AND NOISE REDUCTION METHOD

CROSS-REFERENCE TO RELATED APPLICATION

This application is a continuation of PCT application serial no. PCT/CN2021/070245, filed on Jan. 5, 2021. The entirety of PCT application serial no. PCT/CN2021/070245 is hereby incorporated by reference herein and made a part of this specification.

TECHNICAL FIELD

The present application relates to the technical field of a motor, and more particularly to a noise-reduced power device, a noise reduction mechanism and a noise reduction method.

BACKGROUND ART

With the improvement of people's living standards, attention is increasingly paid to smart home furnishings, such as a lift platform generally used in an office area and the like. In general, the lift platform is lifted or lowered by a linear actuator.

Currently, an end of a lifting column of the linear actuator used for lifting an electric platform is fixedly connected to a drive box, a motor is installed in the drive box, and power may be transmitted to a screw rod to rotate the screw rod through a wormgear-worm structure.

In the above related technology, it is found that, since a large noise will be generated by the motor when the linear actuator works, an office environment will be affected. Therefore, a noise-reduced power device is still required in the field.

SUMMARY

In order to improve a problem of generating vibration and noise when a linear actuator works, the present application provides a noise-reduced power device, a noise reduction mechanism and a noise reduction method.

In a first aspect, the present application provides the noise-reduced power device adopting the following technology solution:

the noise-reduced power device includes a housing, a transmission assembly is provided in the housing, a power input end of the transmission assembly is connected to a motor, a power output end thereof is connected to a screw rod extending out of the housing, a gap is formed between the motor and an inner wall of the housing, and a noise reduction mechanism is provided around the motor.

By adopting the above technical solution, when the motor rotates, the transmission assembly generates a rotational resistance to the motor, which may cause vibration of a motor body. In addition, since the gap is defined between the motor and the bottom of the housing, the motor is hung in the housing, which can reduce the noise when the motor works.

In an embodiment, the noise reduction mechanism includes a soft support assembly provided in the housing, which includes at least two abutting faces, and the motor is located between the two abutting faces and abuts against a sidewall of the abutting face.

By adopting the above technical solution, since the soft support assembly abuts against a sidewall of the motor, when the motor vibrates, the soft support assembly can allow the motor to generate a certain degree of vibration, and absorb vibration energy of the motor, which reduces the noise generated by vibration of the motor.

In an embodiment, the abutting face is provided with a first positioning groove fit with the sidewall of the motor.

By adopting the above technical solution, two sidewalls of the motor are embedded into the first positioning groove by providing the first positioning groove, which provides an inclined support force to the motor and further improves a stability of the motor.

In an embodiment, the transmission assembly includes a power transferring casing fixedly connected to the housing of the motor, a lower surface of the power transferring casing is provided with a movement fixing board, and the movement fixing board and power transferring casing are fixedly connected to the bottom of the housing. An end of the screw rod is located in the power transferring casing and connected with a wormgear, an output shaft of the motor is located in the power transferring casing and connected to a worm engaged with the wormgear, and a thickness of the movement fixing board is greater than a width of the gap between the motor and the bottom of the housing.

By adopting the above technical solution, the motor drivers the worm to rotate, then the worm drives the wormgear to rotate. The screw rod is driven to rotate by fixed connection between the screw rod and the worm, and it provides a driving force to a slide block for axial movement by thread connection between the screw rod and the slide block. When the motor rotates, the worm generates a reverse thrust on the motor, the reverse thrust acts on a plane where the wormgear locates, and the motor always has a tendency to swing towards a direction of the reverse thrust, so that the motor is easy to generate vibration along the direction of the reverse thrust. The two abutting faces of the soft support assembly abuts against two sides of the motor, and are located on the plane where the wormgear locates, which can absorb and reduce the vibration of the motor along the direction of the reverse thrust, and further reduce the noise.

In an embodiment, the housing is of a rectangle, and an included angle between an axis of the motor and a long side of the housing is defined as a, satisfying $13°<\alpha<16°$.

By adopting the above technical solution, the axis of the motor deviates from a diagonal of the housing with a certain angle by controlling the included angle between the axis of the motor and the long side of the housing, so that a tail of the motor has a larger swing range.

In an embodiment, the soft support assembly includes a first buffer and a second buffer provided at two sides of the motor, respectively. A sidewall of the first buffer towards the motor is the abutting face, a side of the first buffer departing from the abutting face is provided with a deformation surface, and an included angle between the deformation surface and the long side of the housing is defined as β, satisfying $17°<\beta<20°$.

By adopting the above technical solution, the abutting face abuts against the sidewall of the motor, and the deformation surface is located at a side departing from the motor and approaches an inner wall of the housing. The deformation surface is arranged in an inclined way relative to the long side of the housing, so that the included angle is defined between the deformation surface and the inner wall of the housing, and further a reserved space is formed between them. When the motor vibrates, the abutting face of the first buffer is applied pressure, while the first buffer is pressed by the pressure. However, there is the reserved space between the deformation surface and the inner wall of the housing, so that the first buffer is bended towards an outer wall of the housing. Therefore, when the vibration and noise of the motor are absorbed, the motor have a lager freedom, so as to further reduce the vibration of the motor.

In an embodiment, the first buffer is of a wedge shape, and has a gradually increasing volume along the axis direction of the motor departing from the worm. An large end of the first buffer abuts against a sidewall of a tail of the motor, and an small end thereof abuts against the sidewall of the motor facing the output shaft thereof.

By adopting the above technical solution, since the motor has a fixed front end and a free end, the motor may have a lager vibration amplitude when it swings, and the vibration can be absorbed by a portion with a large volume of the first buffer.

In an embodiment, the second buffer is defined with a wiring groove.

By adopting the above technical solution, the wiring groove has a routing effect. The wire is wrapped by the second buffer when passing through the wiring groove, so that the wire is not easy to be touched when the screw is mounted, so as to reduce a damage to the wire.

In an embodiment, the wiring groove is provided at top, bottom or sidewall of the second buffer.

In an embodiment, the housing is fixed with a bottom pad positioned in the gap, and there is a distance between the bottom pad and the motor.

By adopting the above technical solution, the gap provided below the motor is filled by the bottom pad, so as to reduce a collision between the motor and the bottom of the housing.

In an embodiment, a side support mechanism is fixed in the housing, the sidewalls of the first buffer and the second buffer towards the motor are defined with a mounting groove, two ends of the side support mechanism are positioned in the mounting groove, respectively. A groove for accommodating the motor (5) is defined in a middle of the side support mechanism (22), and the side support mechanism (22) abuts against the sidewall of the motor (5).

By adopting the above technical solution, the side support mechanism is fixed on the bottom of the housing and abuts against the sidewall of the motor, which can abut against the motor and reduce the vibration and noise of the motor. In addition, the side support mechanism is embedded into the first buffer and the second buffer, so that the first buffer and the second buffer can be located.

In an embodiment, the side support mechanism includes a side support block fixed at the bottom of the housing, the side support block is hollow, a sidewall thereof towards the motor is defined with a second positioning groove, and an inner wall thereof departing from the motor is fixed with an elastic part. An end of the elastic part towards the motor is connected with an abutting block, which extends out of the second positioning groove and abuts against the sidewall of the motor.

By adopting the above technical solution, the abutting block is connected to the inner wall of the side support block by the elastic part, so that the motor is clamped between the two abutting blocks. Two side walls of the motor are abuts against the abutting block, and the abutting block is pressed towards the side support block, while the elastic part, for example, a spring, is in a pressing state, the two abutting blocks are pushed towards the motor, so as to clamp the motor. When the motor vibrates, partial vibration of the motor can be absorbed by the spring.

In an embodiment, a sidewall of the abutting block towards the motor is of inwardly concave arc shape, an opposite sidewall is fixed with a guiding cylinder, and a spring penetrates through the guiding cylinder.

By adopting the above technical solution, the sidewall of the abutting block is of inwardly concave arc shape, so that the abutting block better fits with the sidewall of the motor, thereby having a more stable clamping.

In an embodiment, a connecting board is provided between the two side support blocks, and the connecting board is parallel to the bottom of the housing and fixed on the bottom of the housing.

By adopting the above technical solution, the connecting board is connected to the two side support blocks, which improves structural integration. When a first side support block is applied an excessive pushing force by the motor, the force can be dispersed by a second side support block, which improves a connection strength of the side support blocks.

In an embodiment, a deformable groove is defined in the first buffer, a first sidewall thereof departing from the motor bulges towards the motor, and a second sidewall facing the motor bulges towards a direction departing from the motor.

By adopting the above technical solution, when the sidewall of the first buffer is pressed, the first buffer is deformed. Two bulged sidewalls of the deformable groove abuts against each other, and they have gradually increasing contact area, which increases the support force on motor. The support force has a gradually increasing increase rate, so as to generate better buffering and vibration reduction effects on the motor.

In a second aspect, the present application provides a noise reduction mechanism of the power device adopting the following technical solution:

the noise reduction mechanism of the power device includes a first buffer and a second buffer for clamping the power device, sidewalls of the first buffer and the second buffer towards the power device acts as an abutting face, and a side of the first buffer departing from the abutting face is provided with an inclined deformation surface.

By adopting the above technical solution, the abutting faces of the first buffer and the second buffer abuts against the sidewall of the power device, which can absorb the vibration and noise generated by the power device. The whole first buffer can be deformed by providing the deformation surface. When it is subjected to significant impact, it can have further vibration effect due to the whole deformation of the first buffer.

In an embodiment, side support mechanisms are provided in the first buffer and the second buffer, respectively. The side support mechanism includes a side support block fixed at the bottom of the housing, the side support block is hollow, in which a sidewall thereof is provided with a second positioning groove, an inner wall thereof is fixed with an elastic part, and an end thereof towards the motor is connected with an abutting block extending out of the positioning groove.

By adopting the above technical solution, the abutting block is connected to the inner wall of the side support block by the elastic part, so that when the power device is clamped between the two abutting blocks, the two sidewalls of the power device abuts against the abutting block and presses the abutting block towards the side support block, while the spring is in a pressing state, the two abutting blocks are pushed towards the power device, so as to clamp the power device. When the power device vibrates, partial vibration of the power device can be absorbed by the spring.

In an embodiment, a sidewall of the abutting block towards the power device is of inwardly concave arc shape, an opposite sidewall is fixed with a guiding cylinder, and a spring penetrates through the guiding cylinder.

By adopting the above technical solution, the sidewall of the abutting block towards the power device is of inwardly concave arc shape, so that the abutting block better fits with the sidewall of the power device, thereby having a more stable clamping.

In a third aspect, the present application provides a noise reduction method adopting the following technical solution:
in the noise reduction method of the above power devices,
a movement fixing board is mounted between the power transferring casing and the bottom of the housing at first, an end of the motor is fixed on the power transferring casing, so that the gap is formed between the motor and the bottom of the housing. A thickness of the movement fixing board is greater than a width of the gap between the motor and the bottom of the housing, so that the motor is hung in the housing. After that, the soft support assembly is wrapped around the motor in the housing, so that the motor is supported and clamped by the soft support assembly.

By adopting the above technical solution, the power transferring casing is fixed at the bottom of the housing, then a first end of the motor is fixed on the power transferring casing, a second end thereof is hung in the housing, so the tail of the motor has a certain freedom and large swing amplitude. When the wormgear and worm are engaged with each other, the generated vibration can be offset by slight swing of the tail of the motor, which reduces the vibration effect between the wormgear and worm. In addition, it can reduce vibration and noise of the motor by providing the soft support assembly in the housing.

DETAILED DESCRIPTION

The present application will be further described in detail below in combination with FIGS. 1-8.

An embodiment of the present application discloses a noise-reduced power device and a noise reduction mechanism.

Figure 1:
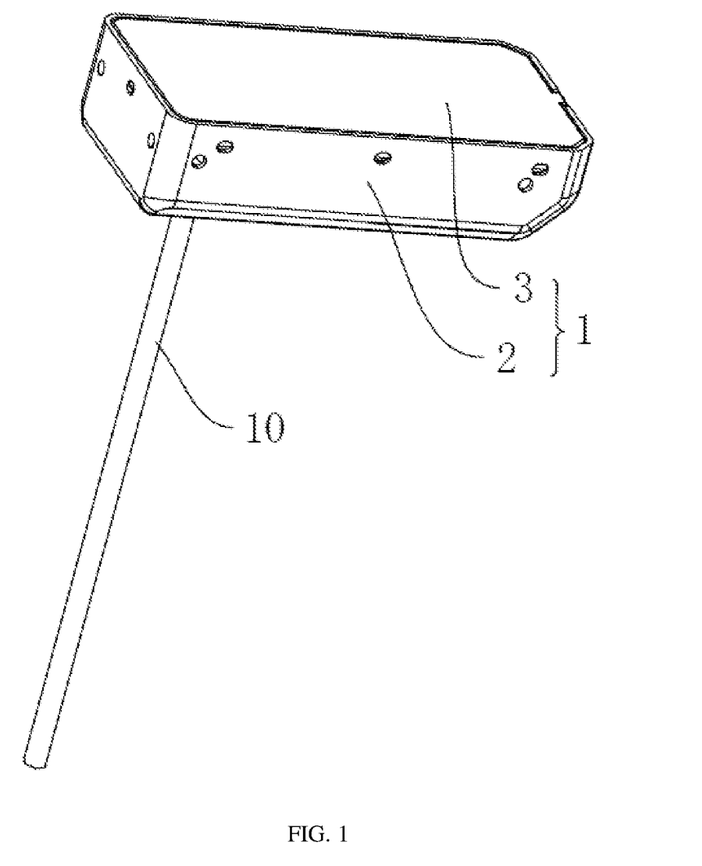
FIG. 1 is a schematic structural view of a noise-reduced power device according to an embodiment of the present application.
Figure 2:
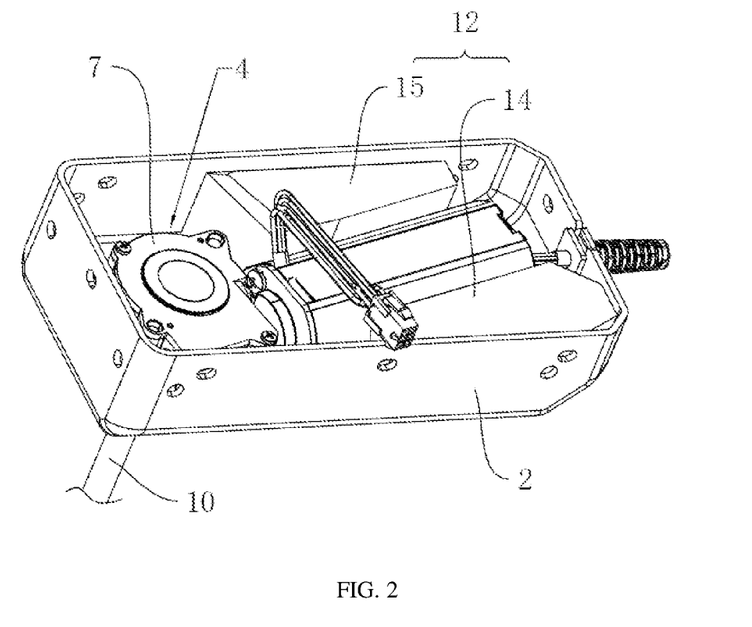
FIG. 2 is an inner schematic structural view of a soft support assembly according to an embodiment of the present application.

Referring FIGS. 1-2, the noise-reduced power device includes a housing 1, in which the housing 1 can be of a shape such as rectangle, square, and the like. The housing 1 is provided with a transmission assembly 4 and a motor 5 for applying power to the transmission assembly 4. A screw rod 10 is provided penetrating the housing 1, a first end of the screw rod 10 is located out of the housing 1, and a second end thereof is located in the housing 1 and connected to the transmission assembly 4. The motor 5 drives the screw rod 10 to rotate via the transmission assembly 4. The first end of screw rod 10 located outside the housing 1 is connected to a column to be raised or lowered, for example, by a thread connection. In an embodiment, the screw rod 10 can be limited to be raised or lowered only along an axis by limiting rotation of the column, thereby forming a screw-rod-slider structure. The screw rod 10 is generally provided vertically when in use, and positioned below the housing, and the rotation of the screw rod 10 drives the column to move along an axis direction of the screw rod 10 relative to the housing 1.

Referring to FIG. 1, the housing 1 includes a mounting box 2 with an opening in a surface and a top cap 3 covering the mounting box 2.

Figure 3:
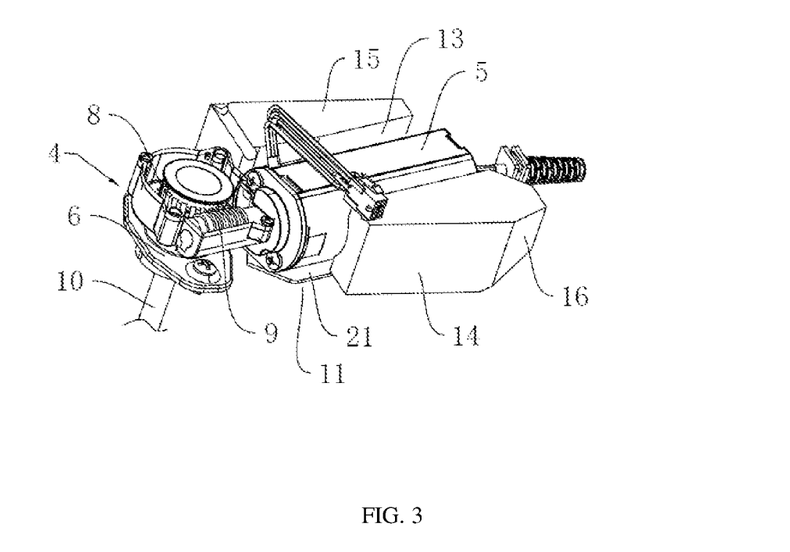
FIG. 3 is a schematic structural view of a transmission assembly according to an embodiment of the present application.

Referring to FIGS. 2-3, the transmission assembly 4 includes a movement fixing board 6 fixedly connected below housing 1. The movement fixing board 6 is fixed with a power transferring casing 7, and a wormgear 8 is rotationally connected in the power transferring casing 7 via a rotation shaft. In an embodiment, the rotation shaft is a hollow column. The second end of screw rod 10 located in the housing 1 is passed through the rotation shaft and fixed with the wormgear 8 by a key. Therefore, one end of the wormgear 8 connecting to the screw rod 10 acts as a power output end, so that the screw rod 10 is rotated by the rotation of the wormgear 8. In an embodiment, a lower end of the screw rod 10 is rotationally connected to a bottom of the housing 1 via a bearing, and the screw rod 10 can be axially limited by the bearing, so that the power transferring casing 7 is pressed against the movement fixing board 6.

An output shaft of the motor 5 enters the power transferring casing 7 and is fixed connected to the worm 9 engaged with the wormgear 8. Therefore, the worm 9 acts as a power input end of the transmission assembly 4, and the worm 9 and the wormgear 8 are rotated by the rotation of the motor 5.

Referring to FIG. 3, during a drive process of the motor 5, the worm 9 and the wormgear 8 act with each other, so that the wormgear 8 generates a reverse thrust on worm 9. Vibrations generated by the motor 5 and power transferring casing 7 are located in a plane perpendicular to an axis of the screw rod 10 since the power transferring casing 7 is locked in the axis direction of the screw rod 10. The reverse thrust generated on the worm 9 by the wormgear 8 generates a component force along a horizontal direction, therefore, the motor 5 has a large vibration amplitude towards a direction of the component force.

The motor will generate a vibration during operation, and will generate a large noise when it contacts the housing 1. In some embodiments, a first end of the motor 5 facing the output shaft is fixedly and threadedly connected to the power transferring casing 7, and a second end thereof is a free end. Therefore, a gap 11 is defined between the motor 5 and the bottom of the housing 1, so that the motor 5 is hung in the housing 1, which can reduce the noise generated due to the contact of the motor 5 and the housing 1.

Figure 4:
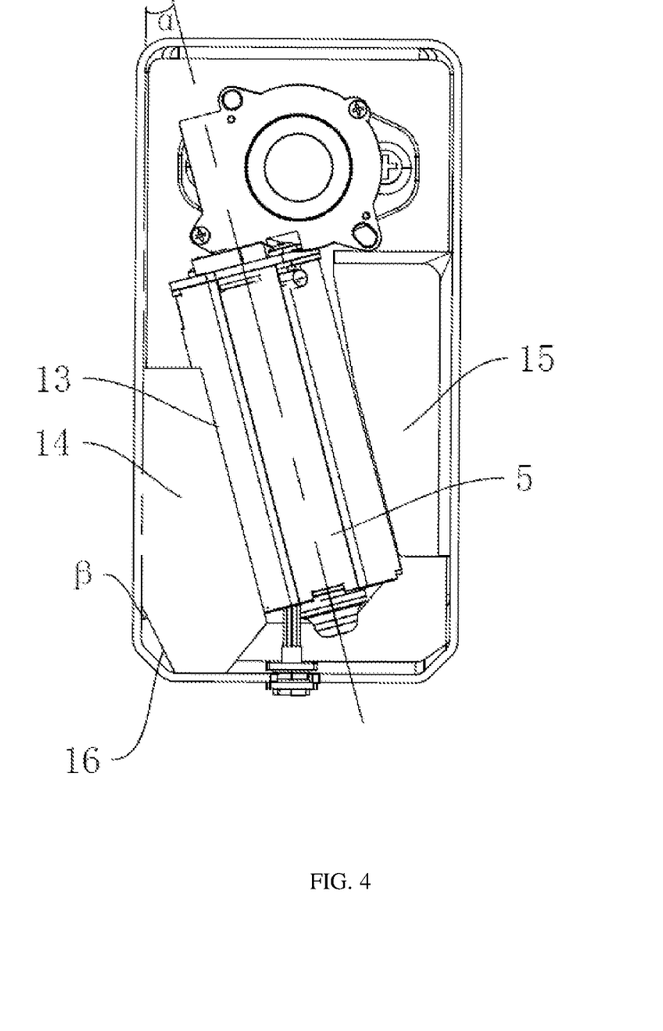
FIG. 4 is a top view of a housing according to an embodiment of the present application.

Referring to FIG. 4, the motor 5 is arranged in an inclined way in the housing 1. An included angle between the axis of the motor 5 and a long side of the housing 1 is defined as a, satisfying 13°<α<16°, so that the motor 5 has a maximum swing angle in the housing 1.

Referring to FIGS. 2-3, in an embodiment, the housing 1 is provided with a noise reduction mechanism including a soft support assembly 12 provided in the housing 1, which is used for supporting and reducing vibration for a hanging portion of the motor 5. The soft support assembly 12 is made from an elastic sponge, and includes at least two abutting faces 13 abutting against a sidewall of the motor 5, so as to reduce vibration of the motor 5.

In an embodiment, as shown in FIGS. 3-4, the soft support assembly 12 includes a first buffer 14 and a second buffer 15, and the motor 5 is located between the first buffer 14 and the second buffer 15. The motor 5 is clamped by the first buffer 14 and the second buffer 15, which can support the motor 5, so as to effectively reduce the vibration of the motor 5.

Referring to FIG. 4, the first buffer 14 is of a polygon, in which a sidewall thereof towards the motor 5 is an abutting face 13, and a sidewall departing from the motor 5 is a deformation surface 16. In an embodiment, an included angle between the deformation surface 16 and the long side of the housing 1 is defined as β, satisfying 17°<β<20°, so that the first buffer 14 can be deformed when it is pressed towards the abutting face 13 by the motor 5, thereby improving buffering and vibration reduction effects for the motor 5.

Referring to FIG. 4, the second buffer 15 is located at a side of the motor 5 departing from the first buffer 14, and a first sidewall of the second buffer 15 abuts against the motor 5, and a second sidewall thereof abuts against an inner wall of the housing 1. The motor 5 are supported and buffered by the first buffer 14 and the second buffer 15, which reduces vibration and noise of the motor 5.

Figure 5:
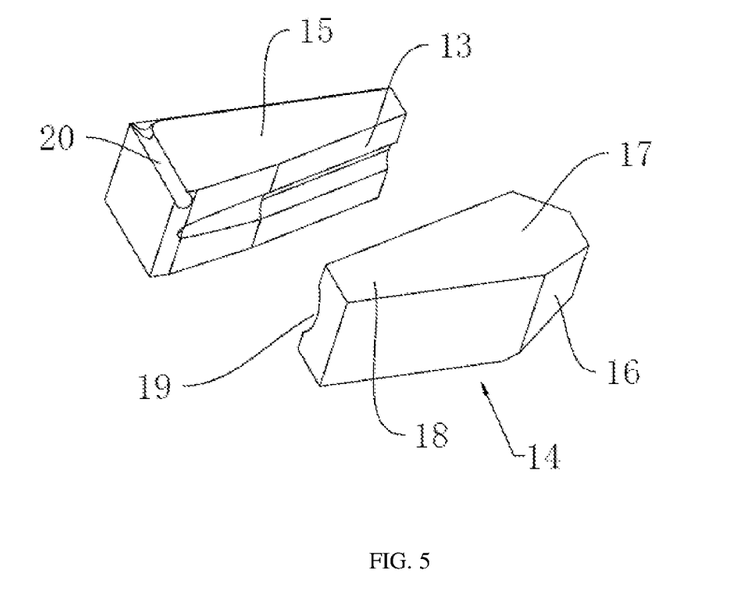
FIG. 5 is a sectional schematic structural view of a soft support assembly according to an embodiment of the present application.

The worm 9 and the wormgear 8 act with each other during the drive process of the motor 5. Since the reverse thrust generated on worm 9 by the wormgear 8 generates a component force, the motor 5 has a large vibration amplitude towards the direction of the component force. The first buffer 14 is provided at a side of the motor 5 being subjected to the reverse thrust from the wormgear 8, as shown in FIG. 5, and the first buffer 14 is of a wedge shape, having a gradually increasing volume along the axis direction of the motor 5 departing from the worm 9, while having a gradually increasing sectional area along the axis direction of the motor 5 departing from the worm 9, which is a sectional area of the first buffer 14 along a short side of the housing 1. A large end of the first buffer 14 abuts against a sidewall of a tail end of the motor 5, and a small end thereof abuts against the sidewall of the motor 5 facing the worm 9. When the motor 5 swings, the tail end of the motor 5 has a large swing range. Therefore, it can support the tail end of the motor 5 and reduce the vibration of the tail of the motor 5 to a greater extent due to providing the large end. In addition, since the large end and the small end of the first buffer 14 are integrally formed with each other, when the large end is deformed by pressing, the small end also is deformed to some extent, thereby dispersing a force.

Referring to FIG. 5, in order to improve a support to the motor 5, the abutting face 13 of the first buffer 14 against the second buffer 15 is defined with a first positioning groove 19. In an embodiment, the first positioning groove 19 is arc-shaped to match the sidewall of the motor 5, so that the first buffer 14 and the second buffer 15 provide a better support to the motor 5. The second buffer 15 is defined with a wiring groove 20. In some embodiments, the wiring groove 20 can be provided at a position such as top, bottom, sidewall, or the like of the second buffer 15. A lead of the motor 5 is passed through the wiring groove 20 and extends out of the housing 1, so as to be wrapped by an inner wall of the wiring groove 20 to limit a position of the lead. When it needs to provide a screw through the housing 1, it can avoid a possibility of damaging the lead by the screw.

Referring FIG. 3, the hanging portion of the motor 5 will be subjected to a downward force under its own gravity, so that it is easy to generate a downward swing during a vibration process. Therefore, in some embodiments, a bottom pad 21 is further provided in the gap 11 between the motor 5 and the bottom of the housing 1. The bottom pad 21 can be an elastic sponge. A lower surface of the bottom pad 21 is stuck to the bottom of the housing 1 by a glue, and there is a gap between a top surface of the bottom pad 21 and the lower surface of the motor 5. When the motor 5 vibrates downwards, the bottom pad 21 acts as a buffer, so that the motor 5 does not directly collide with the bottom of the housing 1.

Figure 6:
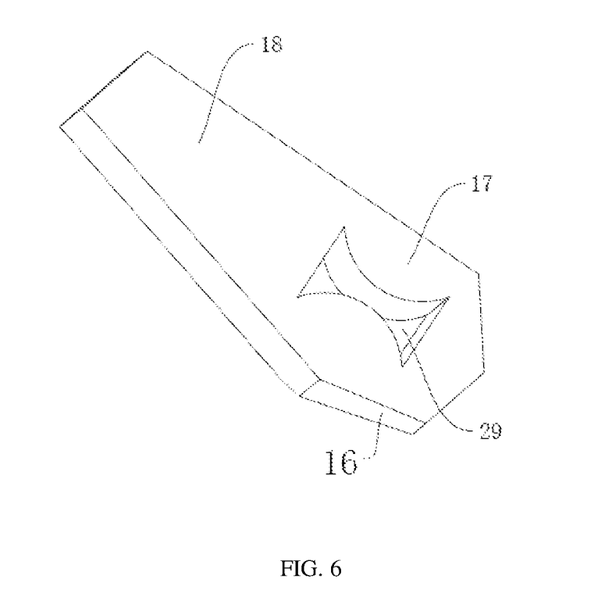
FIG. 6 is a schematic structural view of a soft support assembly according to another embodiment of the present application.

In another embodiment, referring to FIG. 6, a deformable groove 29 is provided in the first buffer 14. The deformable groove 29 is located in the large end of the first buffer 14, in which a sidewall thereof departing from the motor 5 bulges towards the motor 5, a sidewall facing the motor 5 bulges towards a direction departing from the motor 5. Two arc-shaped sidewalls of the deformable groove 29 are provided symmetrically relative to each other, and a symmetrical axis of the two arc-shaped sidewalls is parallel to the axis of the motor 5.

Figure 7:
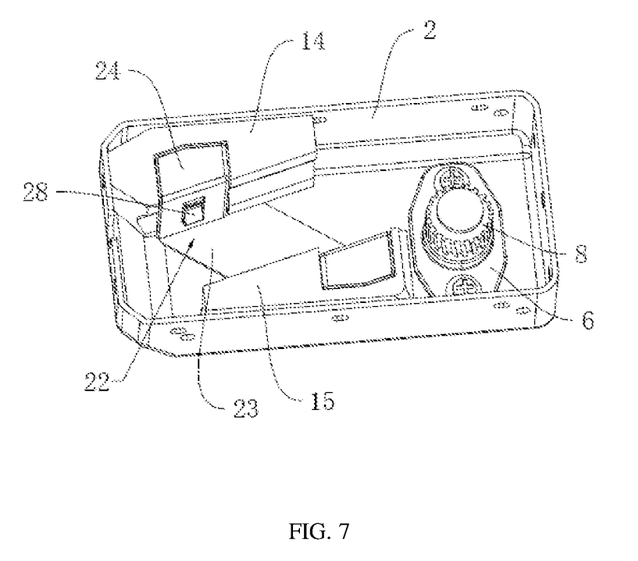
FIG. 7 is an inner schematic structural view of a soft support assembly according to another embodiment of the present application.

In another embodiment, referring to FIG. 7, the noise reduction mechanism further includes a side support mechanism 22 including a connecting board 23 fixed at the bottom of the housing 1 by a screw and parallel to the bottom thereof. Projections of the connecting board 23 and the motor 5 on the bottom of the housing 1 form an X-shape. Two ends of the connecting board 23 extend toward bottoms of the first buffer 14 and the second buffer 15, respectively. Side support blocks 24 are integrally formed at two ends of the connecting board 23, respectively. The first buffer 14 and the second buffer 15 are respectively defined with mounting grooves 25 for insertion of the side support block 24, and openings of the two mounting grooves 25 face towards the sidewall of the motor 5, in which one of the side support block 24 is located at the large end of the first buffer 14 and abuts against the sidewall of the motor 5.

Figure 8:
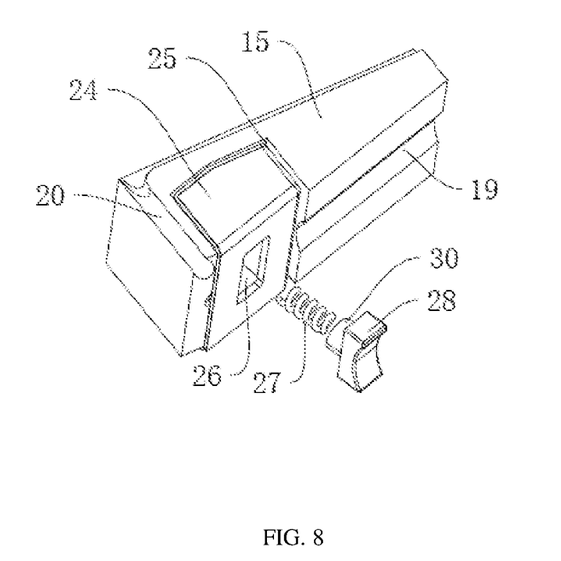
FIG. 8 is an explosion view of a soft support assembly according to another embodiment of the present application.

Referring to FIG. 8, taking one of the side support block 24 as an example, the side support block 24 is hollow, a sidewall thereof towards the motor 5 is defined with a second positioning groove 26, and an inner wall thereof departing from the motor 5 is fixed (for example, by glue) with an elastic part 27, such as a spring. An end of the elastic part 27 towards the motor 5 is connected with an abutting block 28, and a sidewall of the abutting block 28 towards the elastic part 27 is integrally formed with a guiding cylinder, which is a hollow cylindrical shape. An end of the elastic part 27 extends into the guiding cylinder and welded to the abutting block 28. A first end of the abutting block 28 is located in the side support block 24, and a second end of the abutting block 28 extend out of the second positioning groove 26 and abuts against the sidewall of the motor 5. In some embodiments, the side support block 24 and the abutting block 28 are made of a resin material, and a sidewall of the abutting block 28 towards the motor 5 is of inwardly concave arc-shape, so that the sidewall of the abutting block 28 matches with the sidewall of the motor 5. The sidewall of the side support block 24 facing the motor 5 is located in the sidewall of the first buffer 14 or the sidewall of the second buffer 15.

An implementation principle for an embodiment is as follows. The first buffer 14 and the second buffer 15 are respectively inserted at two sides of the motor 5 in the housing 1, so the two sidewalls of the motor 5 are inserted into the first positioning grooves 19. The gap 11 is formed between the motor 5 and the bottom of the housing 1, so that the motor 5 is hung in the housing 1. Finally, the top cap 3 covers the mounting box 2, so that the motor 5 does not collide with the inner wall of the housing 1 when the motor 5 is started and vibrates, and the vibration and noise of the motor 5 are absorbed by the first buffer 14 and the second buffer 15.

When the motor 5 vibrates, the large end of the first buffer 14 is pressed, and the two arc-shaped sidewalls approach each other, during which, a contact between the arc-shaped sidewalls gradually changes from a line contact to surface contact, so that the first buffer 14 imposes a gradually increasing support force on the motor 5, even by a gradually increasing increase rate, therefore realizing a better absorption effect for the vibration of the motor 5. When the motor 5 is clamped between the two side support blocks 24, the sidewalls of the motor 5 apply an abutting force to the two abutting blocks 28, so that they are pressed towards an interior of the side support block 24. Thereby, the elastic part 27 is pressed, and pushes the abutting block 28 to press against the sidewall of the motor 5, so as to fix the motor 5. Therefore, when the motor 5 vibrates, vibration energy of the motor 5 can be absorbed by the elastic part 27, so as to reduce vibration and noise.

An embodiment of the present application further discloses a noise reduction method of a power device, in which the movement fixing board 6 is mounted between the power transferring casing 7 and the bottom of the housing 1 at first, so that the power transferring casing 7 and the movement fixing board 6 are fixed at the bottom of the housing 1. Then the end of the motor 5 is fixed on the power transferring casing 7, so that the gap 11 is formed between the motor 5 and the bottom of the housing 1, and the motor 5 is hung in the housing 1, in which the thickness of the movement fixing board 6 is greater than the width of the gap 11 between the motor 5 and the bottom of the housing 1. After that, the soft support assembly 12 is wrapped around the motor 5 in the housing 1 for supporting the motor 5 and reducing vibration of the motor 5.

An implementation principle of the noise reduction method of the power device for an embodiment is as follows. The motor 5 is hung in the housing 1, so the motor 5 has a certain freedom when vibrated. On the one hand, it can reduce the vibration between the wormgear 8 and worm 9, and on the other hand, it can reduce the vibration and collision between the motor 5 and the housing 1 and, in turn, the noise. In addition, providing the soft support assembly 12 in the housing 1 can support the motor 5 and reduce the vibration can be reduced, and further can avoid a resonance between motor 5 and a gas in the housing 1, thereby further reducing the noise. The above are the preferred embodiments of the present application, which are not intended to limit the protection scope of the present application. Therefore, all equivalent changes made according to the structure, shape and principle of the present application should be covered within the protection scope of the present application.

LIST OF REFERENCE MARKS 1. housing
2. mounting box
3. top cap
4. power transferring assembly
5. motor
6. movement fixing board
7. power transferring casing
8. wormgear
9. worm
10. screw rod
11. gap
12. soft support assembly
13. abutting face
14. first buffer
15. second buffer
16. deformation surface
19. first positioning groove
20. wiring groove
21. bottom pad
22. side support mechanism
23. connecting board
24. side support block
25. mounting groove
26. second positioning groove
27. elastic part
28. abutting block
29. deformable groove
30. guiding cylinder

What is claimed is:

1. A noise-reduced power device comprising a housing, wherein a transmission assembly is provided in the housing, a power input end of the transmission assembly is connected to a motor, a power output end of the transmission assembly is connected to a screw rod extending out of the housing, a gap is formed between the motor and an inner wall of the housing, and a noise reduction mechanism is provided around the motor, wherein the noise reduction mechanism comprises a support assembly provided in the housing, the support assembly comprises at least two abutting faces, the motor is located between the at least two abutting faces and abuts against a sidewall of each of the at least two abutting faces, each of the at least two abutting faces is provided with a first positioning groove fit with a sidewall of the motor, the support assembly further comprises a first buffer and a second buffer provided at two sides of the motor, respectively, and a sidewall of the first buffer towards the motor is at least one of the at least two abutting faces, and wherein a side support mechanism is fixed in the housing, the sidewall of the first buffer and a sidewall of the second buffer towards the motor are defined with a mounting groove, two ends of the side support mechanism are positioned in the mounting groove, respectively, a groove for accommodating the motor is defined in a middle of the side support mechanism, and the side support mechanism abuts against the sidewall of the motor.

2. The noise-reduced power device according to claim 1, wherein the transmission assembly comprises a power transferring casing fixedly connected to the housing, a lower surface of the power transferring casing is provided with a movement fixing board, the movement fixing board and the power transferring casing are fixedly connected to a bottom of the housing, an end of the screw rod is located in the power transferring casing and connected with a wormgear, and an output shaft of the motor is located in the power transferring casing and connected with a worm engaged with the wormgear.

3. The noise-reduced power device according to claim 1, wherein the housing has a rectangular shape, and an included angle between an axis of the motor and a long side of the housing is defined as a, satisfying $13°<\alpha<16°$.

4. The noise-reduced power device according to claim 1, wherein a deformable groove is defined in the first buffer, a first sidewall of the deformable groove departing from the motor bulges towards the motor, and a second sidewall of the deformable groove facing the motor bulges towards a direction departing from the motor.

5. The noise-reduced power device according to claim 1, wherein the side support mechanism comprises a side support block fixed at a bottom of the housing, the side support block is hollow, a sidewall of the side support block towards the motor is defined with a second positioning groove, an inner wall of the side support block departing from the motor is fixed with an elastic part, an end of the elastic part towards the motor is connected with an abutting block, and the abutting block extends out of the second positioning groove and abuts against the sidewall of the motor.

6. The noise-reduced power device according to claim 5, wherein a sidewall of the abutting block towards the motor has an inwardly concave arc shape, an opposite sidewall of the abutting block is fixed with a guiding cylinder, and a spring penetrates through the guiding cylinder.

7. The noise-reduced power device according to claim 6, wherein a connecting board is provided between the side support block and a second side support block, and the connecting board is parallel to the bottom of the housing and fixed on the bottom of the housing.

8. The noise-reduced power device according to claim 1, wherein a side of the first buffer departing from the at least one of the at least two abutting faces is provided with a deformation surface, and an included angle between the deformation surface and a long side of the housing is defined as β, satisfying $17°<\beta<20°$.

9. The noise-reduced power device according to claim 8, wherein the first buffer has a wedge shape, the first buffer has a gradually increasing volume along an axis direction of the motor departing from a worm, a large end of the first buffer abuts against a sidewall of a tail of the motor, and a small end of the first buffer abuts against the sidewall of the motor facing an output shaft of the motor.

10. The noise-reduced power device according to claim 8, wherein the second buffer is defined with a wiring groove.

11. The noise-reduced power device according to claim 10, wherein the wiring groove is provided at a top, a bottom or a sidewall of the second buffer.

12. A noise reduction mechanism for a power device comprising a first buffer and a second buffer for clamping the power device, wherein sidewalls of the first buffer and the second buffer towards the power device act as an abutting face, and a side of the first buffer departing from the abutting face is provided with an inclined deformation surface, and wherein side support mechanisms are provided in the first buffer and the second buffer, respectively, the side support mechanisms each comprises a side support block fixed at a bottom of a housing, the side support block is hollow, a sidewall of the side support block is provided with a second positioning groove, an inner wall of the side support block is fixed with an elastic part, and an end of the elastic part towards a motor is connected with an abutting block extending out of the second positioning groove.

13. The noise reduction mechanism according to claim 12, wherein a sidewall of the abutting block towards the power device has an inwardly concave arc shape, an opposite sidewall of the abutting block is fixed with a guiding cylinder, and a spring penetrates through the guiding cylinder.

14. A noise-reduced power device comprising a housing, wherein a transmission assembly is provided in the housing, a power input end of the transmission assembly is connected to a motor, a power output end of the transmission assembly is connected to a screw rod extending out of the housing, a gap is formed between the motor and an inner wall of the housing, and a noise reduction mechanism is provided around the motor, wherein the noise reduction mechanism comprises a support assembly provided in the housing, the support assembly comprises at least two abutting faces, the motor is located between the at least two abutting faces and abuts against a sidewall of each of the at least two abutting faces, and each of the at least two abutting faces is provided with a first positioning groove fit with a sidewall of the motor, wherein the support assembly comprises a first buffer and a second buffer provided at two sides of the motor, respectively, a sidewall of the first buffer towards the motor is at least one of the at least two abutting faces, a side of the first buffer departing from the at least one of the at least two abutting faces is provided with a deformation surface, and an included angle between the deformation surface and a long side of the housing is defined as β, satisfying $17°<\beta<20°$; and wherein a deformable groove is defined in the first buffer, a first sidewall of the deformable groove departing from the motor bulges towards the motor, and a second sidewall of the deformable groove facing the motor bulges towards a direction departing from the motor.

\* \* \* \* \*